United States Patent [19]
Bhushan et al.

[11] Patent Number: 6,047,717
[45] Date of Patent: Apr. 11, 2000

[54] MANDREL DEVICE AND METHOD FOR HARD DISKS

[75] Inventors: Rajiv Bhushan; Ru Chang, both of Mountain View; Raj Mohindra, Los Altos; Vincent Chiu; Dong T. Tran, both of San Jose, all of Calif.

[73] Assignee: SCD Mountain View, Inc., Mountain View, Calif.

[21] Appl. No.: 09/069,887

[22] Filed: Apr. 29, 1998

[51] Int. Cl.[7] .............................. B08B 3/00; B65G 59/00; A47G 19/08; F16M 11/00; B23Q 1/00

[52] U.S. Cl. ......................... 134/201; 134/137; 134/902; 414/908; 211/41.1; 211/41.12; 248/200; 269/47; 269/52

[58] Field of Search .................................... 134/137, 201, 134/902; 414/908; 248/200; 211/41.1, 41.12; 269/47, 52

[56] References Cited

U.S. PATENT DOCUMENTS

| | | | |
|---|---|---|---|
| D. 199,504 | 11/1964 | Maiolatesi | 211/41.1 |
| 4,471,716 | 9/1984 | Milliren | 118/500 |

(List continued on next page.)

FOREIGN PATENT DOCUMENTS

| | | |
|---|---|---|
| 385 536 | 2/1990 | European Pat. Off. . |
| 41 39 465 | 6/1992 | Germany . |
| 62-188323 | 8/1987 | Japan . |
| 3-124026 | 5/1991 | Japan . |
| 4-34932 | 2/1992 | Japan . |
| 4-79326 | 3/1992 | Japan . |
| 4-83340 | 3/1992 | Japan . |
| 4-192419 | 7/1992 | Japan . |
| 4-233747 | 8/1992 | Japan . |
| 4-239132 | 8/1992 | Japan . |
| 4-251930 | 9/1992 | Japan . |
| 5-13397 | 1/1993 | Japan . |
| 5-136116 | 6/1993 | Japan . |
| 5-283386 | 10/1993 | Japan . |
| 5-283391 | 10/1993 | Japan . |
| 5-326464 | 12/1993 | Japan . |
| 6-163500 | 6/1994 | Japan . |
| 6-177107 | 6/1994 | Japan . |
| 6-196401 | 7/1994 | Japan . |
| 6-163501 | 10/1994 | Japan . |

OTHER PUBLICATIONS

M. Itano, F.W. Kern, Jr., R.W. Rosenberg, M. Miyashita, I. Kawanabe, and T. Ohmi, "Particle Deposition and Removal in Wet Cleaning Processes for ULSI Manufacturing", IEEE Trans. on Semiconductor Manufacturing, vol. 5, No. 02, pp. 114–120, May 1992.

Y. Yagi, T. Imaoka, Y. Kasama, and T. Ohmi, "Advanced Ultrapure Water Systems with Low Dissolved Oxygen for Native Oxide Free Wafer Processing", IEEE Trans. On Semiconductor Manufacturing, vol. 5, No. 2, pp. 121–127, May 1992.

H.G. Parks, J.F. O'Hanlon, and F. Shadman, "Research Accomplishments at the University of Arizona Sematech Center of Excellence for Contamination/Defect Assessment and Control", IEEE Trans. on Semiconductor Manufacturing, vol. 6, No. 2, pp. 134–142, May 1993.

C.S. Ackerman and J.M. Fabia, "Monitoring Supplier Quality at PPM Levels", IEEE Trans. on Semiconductor Manufacturing, vol. 6. No. 2, pp. 189–194, May 1993.

(List continued on next page.)

*Primary Examiner*—Randy Gulakowski
*Assistant Examiner*—Paul J. Lee
*Attorney, Agent, or Firm*—Townsend and Townsend and Crew LLP

[57] ABSTRACT

An improved mandrel device (100) and method. The mandrel device (100) has an elongated member (117) for supporting a plurality of hard disks, for example. The elongated member (117) includes an inner member (107) that is defined between a pair of outer members (105), where each of the members have ridges (103) defined thereon. The combination of these members and ridges are used to support a plurality of disks that do not touch each other during, for example transportation.

21 Claims, 5 Drawing Sheets

U.S. PATENT DOCUMENTS

| | | | |
|---|---|---|---|
| 4,520,834 | 6/1985 | DiCicco | 134/902 |
| 4,633,893 | 1/1987 | McConnell et al. | 134/95 |
| 4,645,401 | 2/1987 | Hopkins et al. | 414/222 |
| 4,715,392 | 12/1987 | Abe et al. | 134/902 |
| 4,731,154 | 3/1988 | Hazlitt et al. | 134/902 |
| 4,750,505 | 6/1988 | Inuta et al. | 134/153 |
| 4,778,532 | 10/1988 | McConnell et al. | 134/10 |
| 4,871,417 | 10/1989 | Nishiawa et al. | 156/640 |
| 4,874,014 | 10/1989 | Grant et al. | 137/606 |
| 4,881,561 | 11/1989 | Schwartzwalder | 134/184 |
| 4,911,761 | 3/1990 | McConnell et al. | 134/11 |
| 4,917,123 | 4/1990 | McConnell et al. | 134/95 |
| 4,957,406 | 9/1990 | Akagawa | 414/416 |
| 4,984,597 | 1/1991 | McConnell et al. | 134/95 |
| 4,987,687 | 1/1991 | Sugimoto | 34/58 |
| 5,082,518 | 1/1992 | Molinaro | 156/345 |
| 5,107,880 | 4/1992 | Pierson | 134/902 |
| 5,129,955 | 7/1992 | Tanaka | 134/2 |
| 5,143,103 | 9/1992 | Basso et al. | 134/98.1 |
| 5,156,174 | 10/1992 | Thompson et al. | 134/153 |
| 5,169,408 | 12/1992 | Biggerstaff et al. | 29/25.01 |
| 5,186,192 | 2/1993 | Netsu et al. | 134/199 |
| 5,190,064 | 3/1993 | Aigo | 134/902 |
| 5,228,206 | 7/1993 | Grant et al. | 34/1 |
| 5,286,657 | 2/1994 | Bran | 437/9 |
| 5,301,701 | 4/1994 | Nafziger | 134/95.2 |
| 5,315,766 | 5/1994 | Roberson, Jr. et al. | 34/409 |
| 5,339,843 | 8/1994 | Benedict et al. | 134/186 |
| 5,421,905 | 6/1995 | Ueno et al. | 134/25.4 |
| 5,423,653 | 6/1995 | Harper | 414/680 |
| 5,440,949 | 8/1995 | Leibman | 74/574 |
| 5,453,046 | 9/1995 | Frame et al. | 452/186 |
| 5,520,744 | 5/1996 | Fujikawa et al. | 134/102.3 |
| 5,569,330 | 10/1996 | Schild et al. | 134/902 |
| 5,791,357 | 8/1998 | Hasegawa | 134/137 |
| 5,829,739 | 11/1998 | Hofmann | 269/43 |
| 5,890,346 | 4/1999 | Guess | 53/459 |

OTHER PUBLICATIONS

G.D. Moss, J.N. DiBello, K.P. Yanders, and R.F. Orr, "Capillary Drying: Particle–Free Wet–Process Drying?"

T. Ohmi, Ultra Clean Technology Handbook, p. 290, 1993.

J. Marra, "Ultra Clean Marangoni Drying", pp. 269–282.

C. McConnell, "Examining the Effects of Wafer Surface Chemistry on Particle Removal Using Direct–Displacement Isopropyl Alcohol Drying", MicroContamination, Feb. 1991.

P. Burggraaf, "Keeping the 'RCA' in Wet Chemistry Cleaning", Semiconductor International, pp. 86–90, Jun. 1994.

M.B. Olesen, "A Comparative Evaluation of the Spin Rinser/Dryer with the IPA Vaport Isodry Technique", Proceedings—Institute of Environmental Sciences, pp. 229–241, 1990.

MANDREL DEVICE AND METHOD FOR HARD DISKS

BACKGROUND OF THE INVENTION

The present invention generally relates to the manufacture of objects. More particularly, the present invention provides a technique, including a method and device, for supporting a plurality of objects, e.g., hard disks, using a novel mandrel device. Merely by way of example, the present invention also can be applied to other objects such as optical disks, magnetic disks, and the like.

In the manufacture of hard disks, industry has always attempted to automate manufacturing processes. Automation begins, in part, by adding computer controlled input and output devices onto processing tools such as servo writers, cleaning stations, and the like. Automation tends to improve the efficiency of machine operators. Automation also reduces the cost of the end products (i.e., hard disks) in a high volume manufacturing line. Industry has gone a long way from manufacturing processes, which tended to be labor intensive, to processes that are highly automated.

Unfortunately, numerous processes in the manufacture of hard disks are not fully automated. As merely an example, transportation of hard disks often occurs by way of a human operator, who is generally holding cassettes in hand. Human operators tend to be, at best, unreliable in some cases, which means they can drop or damage the hard disks. Additionally, transferring hard disks from cassette to equipment input station is labor intensive. In most cases, hard disks are removed by way of a conventional mandrel device that cannot secure each of the disks in position. That is, the conventional mandrel device has a handle and a rigid support member that extends from the handle. The member is substantially a solid piece of plastic material that is insertable into disk openings which align themselves with each other in the cassette. The member does not secure the disks firmly and the disks can touch each other and often slide from one end of the member to the other end of the member. Accordingly, the conventional mandrel device often causes damage to the hard disks themselves and generally cannot be used to effectively transport disks from the cassette.

From the above, it is seen that a disk transferring technique that is safe, easy, and reliable is often desired.

SUMMARY OF THE INVENTION

According to the present invention, a technique including a method and device for supporting a plurality of objects is provided. In an exemplary embodiment, the present invention provides a device for transferring a plurality of hard disks such as those used in computers, for example. The present technique uses a novel mandrel device, which has a plurality of specially designed members.

In a specific embodiment, the present invention provides a mandrel device for supporting a plurality of hard disks. The mandrel has a variety of elements such as an elongated member, which includes a first end and a second end. The first end is insertable into an opening in one of a plurality of hard disks. The second end has a support structure to transfer the elongated member from one location to another location. The mandrel also has an inner member defined in the elongated member. The inner member extends along a portion or the length of the first end to the second end. The inner member includes an upper surface having a plurality ridges (which are substantially normal to the elongated member), where each of the ridges has a lower region defined between a pair of upper regions. A pair of outer members are defined in the elongated member and extend substantially parallel to the inner member. The inner member is defined between the pair of outer members. Each pair of outer members includes an upper surface having a plurality of ridges (which are substantially normal to the elongated member), where each of the ridges has a lower region defined between a pair of upper regions. At least one lower region in the inner member is substantially in parallel alignment with the lower region in each pair of outer members to support an opening region of one of the disks. The inner member and the pair of outer members prevent substantial movement of the disk.

In an alternative embodiment, the present invention provides a novel cleaning system for disks. The cleaning system has a chamber coupled to a mandrel device for transferring disks in and out of the chamber. Among other features, the mandrel has a variety of elements such as an elongated member, which includes a first end and a second end. The first end is insertable into an opening in one of a plurality of hard disks. The second end has a support structure to transfer the elongated member from one location to another location. The mandrel also has an inner member defined in the elongated member. The inner member extends along a portion or the length of the first end to the second end. The inner member includes an upper surface having a plurality ridges (which are substantially normal to the elongated member), where each of the ridges has a lower region defined between a pair of upper regions. A pair of outer members are defined in the elongated member and extend substantially parallel to the inner member. The inner member is defined between the pair of outer members. Each of the outer members includes an upper surface having a plurality of ridges (which are substantially normal to the elongated member), where each of the ridges has a lower region defined between a pair of upper regions. At least one lower region in the inner member is substantially in parallel alignment with the lower region in each of the outer members to support an opening region of one of the disks. The inner member and the pair of outer members prevent substantial movement of the disk.

In still a further embodiment, the present invention provides a novel method of processing a plurality of hard disks using a novel mandrel device. The method includes a step of providing a cassette, which has a plurality of ribs therein. Each of the ribs supports at least one disk such that disks in the cassette are in parallel alignment to each other without touching or sticking to each other. Each of the disks includes an opening therein, which is also in alignment with another disk opening. The method includes a step of providing a mandrel device, such as the one described above, but can be others. The present method also includes a step of inserting the mandrel through the openings in the disks so that the mandrel extends from an one end of the cassette to the other end of the cassette. A step of elevating the mandrel in a vertical direction substantially removes the plurality of disks from the cassette. The method transfers the plurality of disks via the mandrel device to a process operation (e.g., cleaning, etching, rinsing, drying) in the manufacture of the disks. During the transferring step, an inner member and a pair of outer members defined in the mandrel device prevent substantial movement of the disks to keep the disks from sticking to or touching each other, which may prevent damage to the disks.

Numerous benefits are achieved by way of the present mandrel over pre-existing techniques. For example, the present invention provides for the transportation or movement of a plurality of hard disks, each parallel to each other, without substantial movement of any of the disks in some embodiments. In other embodiments, the present invention provides a mandrel device that is substantially portable and can be moved easily from one location to another location. The present mandrel device also substantially removes any liquid droplets from the disks, which have been removed from liquid, in an easy and cost effective manner. These and other benefits are described throughout the present specification and more particularly below.

A further understanding of the nature and advantages of the present invention may be realized by reference to the latter portions of the specification and attached drawings.

DESCRIPTION OF THE SPECIFIC EMBODIMENT

According to the present invention, a technique including a method and device for supporting a plurality of objects is provided. In an exemplary embodiment, the present invention provides a device for transferring a plurality of hard disks such as those used in computers, for example. The present technique uses a novel mandrel device, which has a plurality of specially designed members.

Figure 1:
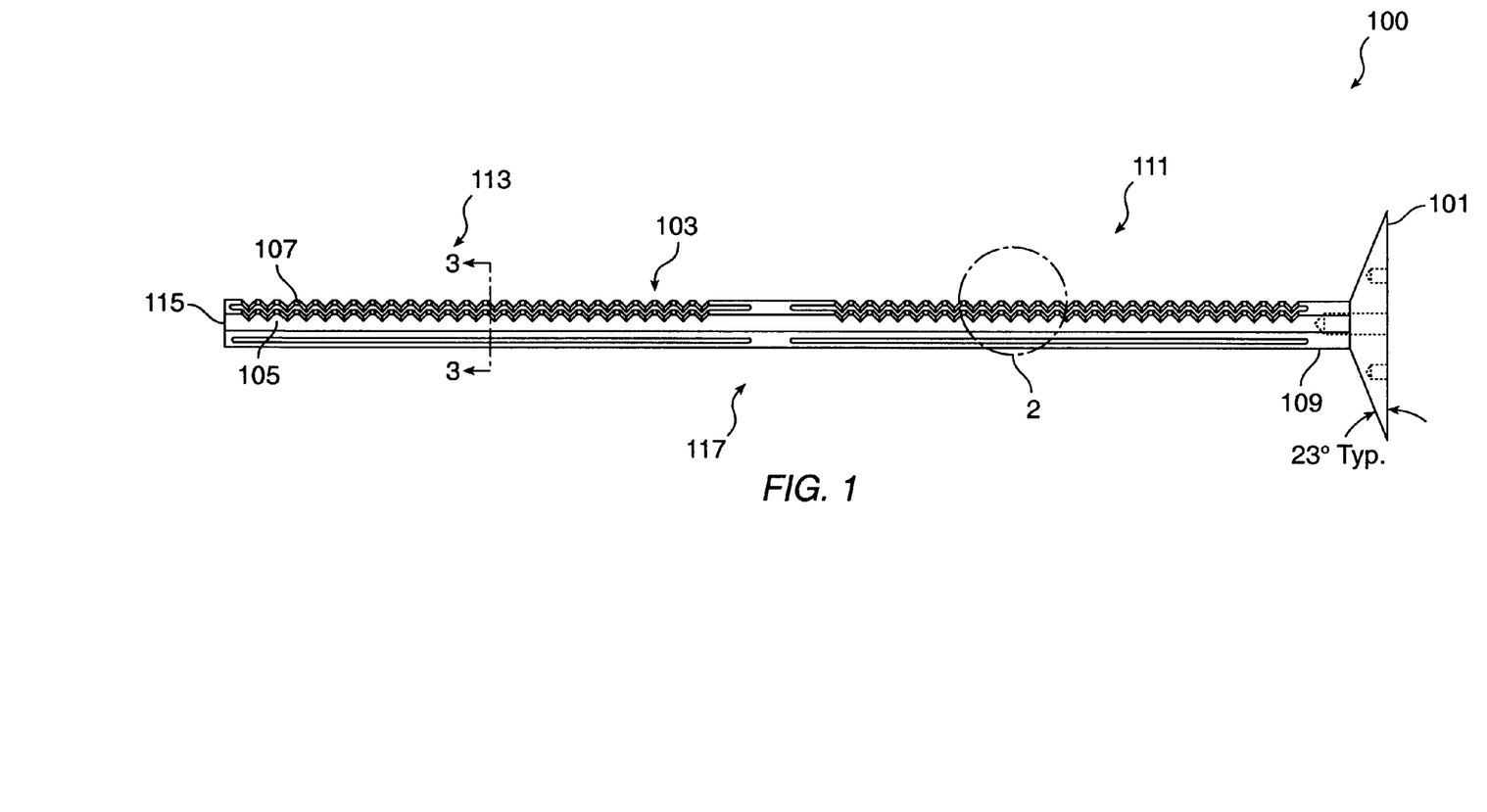
FIG. 1 is a simplified side-view diagram of a mandrel device according to an embodiment of the present invention.

FIG. 1 is a simplified side-view diagram of a mandrel device 100 according to an embodiment of the present invention. This diagram is merely an illustration and should not limit the scope of the claims herein. Mandrel device 100 includes a variety of features such as a support structure 101, which can be attached to a handle or robot. Supporting end 101 extends into elongated member 117, which includes a first end 115 and a second end 109. The first end 115 is insertable into an opening in one of a plurality of hard disks. The second end 109 has support structure 101 to transfer the elongated member from one location to another location.

The mandrel 100 also has an inner member 107 defined in the elongated member. The inner member 107 extends along a portion of the first end to the second end. The inner member 107 includes an upper surface 103 having a plurality ridges (which are substantially normal to the elongated member), where each of the ridges has a lower region defined between a pair of upper regions. A pair of outer members 105 are defined in the elongated member and extends substantially parallel to the inner member. The inner member 107 is defined between the pair of outer members. Each of the outer members includes an upper surface having a plurality of ridges (which are substantially normal to the elongated member), where each of the ridges has a lower region defined between a pair of upper regions. Details of the ridges 111, 113 are shown by way of the next Figs. At least one lower region in the inner member is substantially in parallel alignment with the lower region in each pair of outer members to support an opening region of one of the disks. The inner member and the pair of outer members prevent substantial movement or sway of the disk.

Figure 2:
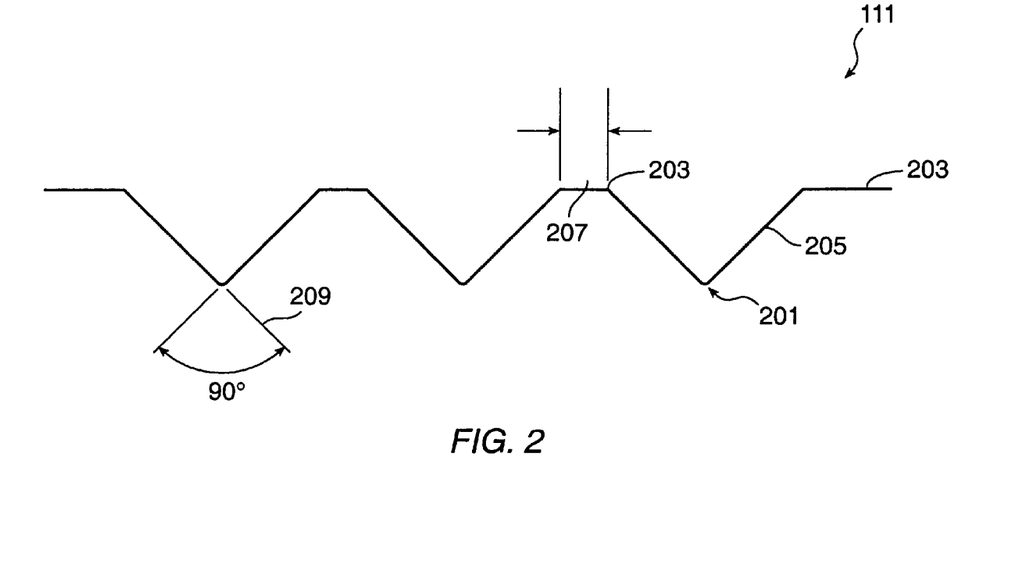
FIGS. 2–5 are simplified diagrams of alternative view diagrams of the mandrel device of FIG. 1 according to embodiments of the present invention.

FIGS. 2–5 are simplified diagrams of alternative views of the mandrel device 100 of FIG. 1 according to embodiments of the present invention. These diagrams are merely illustrations and should not limit the scope of the claims herein. As shown in FIG. 2, for example, a detailed diagram of the ridges 111 is illustrated in the simplified side-view diagram. Each of the ridges 111 has a lower region 201 defined between a pair of upper regions 203. Lower region 201 slopes upwardly on surface 205 to upper regions 203, which are on each side of lower region 201.

As merely an example, a variety of selected dimensions are used in the present embodiment. For 135 mm to 48 mm disks, which have a thickness of about 0.030 inches near the inner periphery, spacing 207 is adjusted to prevent the disks from touching each other during processing. Angle 209, which defines lower region 201, ranges from about 80 degrees to 90 degrees and greater. Preferably, angle 209 is about 90 degrees and greater, but is not limited to these angles.

Figure 3:
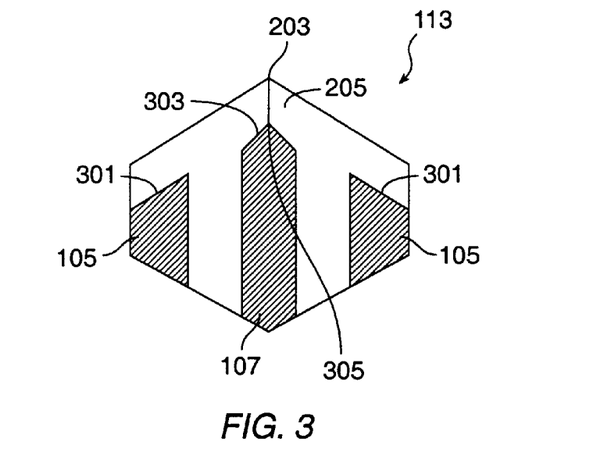

A simplified front-view diagram 113 of the mandrel 100 is illustrated by FIG. 3. The diagram 113 includes a variety of features such as lower region 303 in the inner member 107, which has a pair of beveled regions 303, being perpendicular to the elongated member, that extend to an intersection. The intersection defines apex 305 which contacts with a portion of the opening region in the disk. The lower region 303 also extends along surface 205 to upper region 203. The diagram also includes the outer members 105, each of which has beveled region 301 that extend inwardly toward the inner member 107. That is, beveled region 301 has a positive slope toward the inner member 107.

Figure 4:
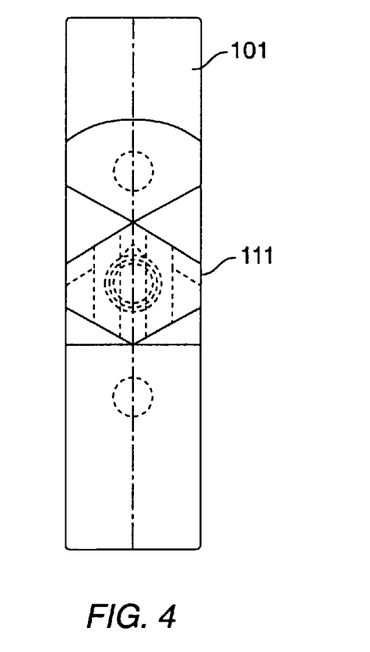
Figure 5:
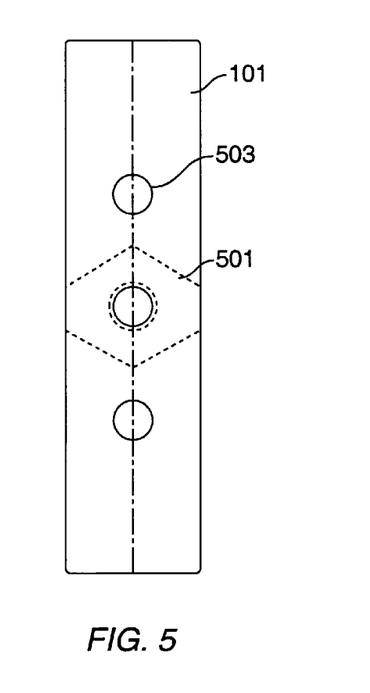

Simplified front and back view diagrams of the mandrel device 100 are shown in FIGS. 4 and 5, respectively. The front view diagram includes elongated member 111 and support structure 101. Back view diagram includes elongated support structure 101 that includes openings 501, 503 for fasteners. The back structure also has a surface that is substantially flat for securing to a robot tool or the like. Alternatively, the back structure can be mounted on a handle that is used by a human operator to move the mandrel device for transporting hard disks.

Figure 6:
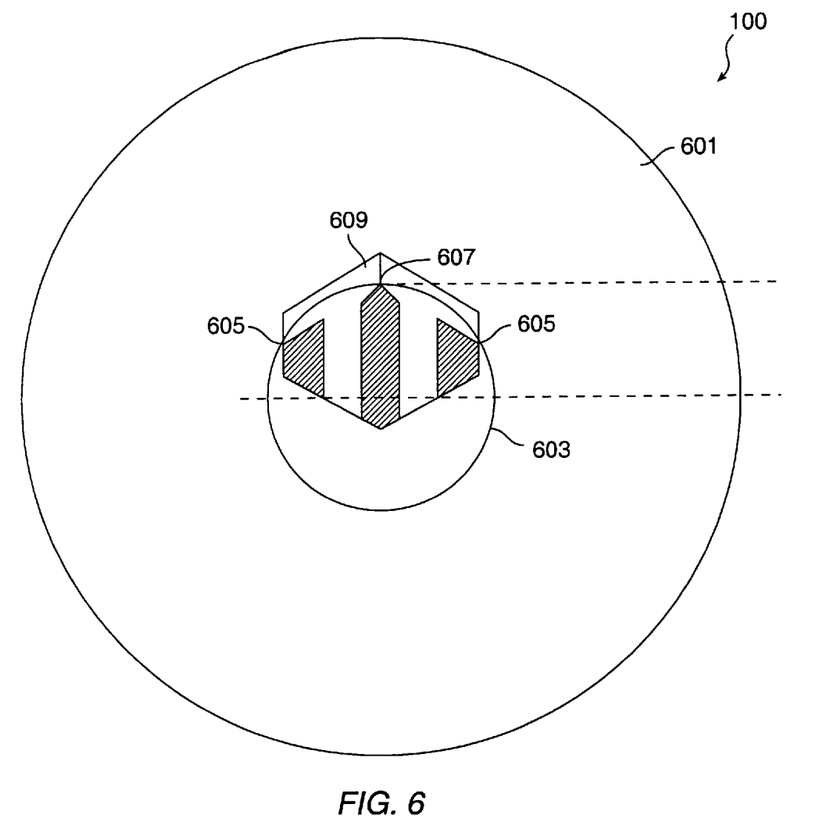
FIG. 6 is a front-view diagram of a mandrel device holding a hard disk according to an embodiment of the present invention.

FIG. 6 is a front-view diagram of mandrel device 100 holding a disk 601 according to an embodiment of the present invention. This diagram is merely an illustration and should not limit the scope of the claims herein. Disk 601 has opening 603, which is substantially circular in shape. Opening 603 is supported by three positions, including positions 605, which are defined on outer members, and position 607, which is defined on inner member. The three positions, which are actually knife edges, support opening 603, which supports disk 601. The three positions support the disk in a vertical manner. The knife edges also can draw fluid away from the disk to enhance cleaning and/or drying of the disk in some embodiments. Center knife edge 607 has a point with sloping sides that draw fluid away from the disk. Outside edges contact the disk at a lower end that draws fluid away from the disk.

Disk movement in the horizontal manner, which is along the length of the elongated member, is supported by region 609. Region 609 substantially prevents the disk from movement in the horizontal manner, e.g., swaying. Accordingly, the present mandrel device prevents a disk from touching another disk upon transportation of the disk from one location to another location.

Figure 7:
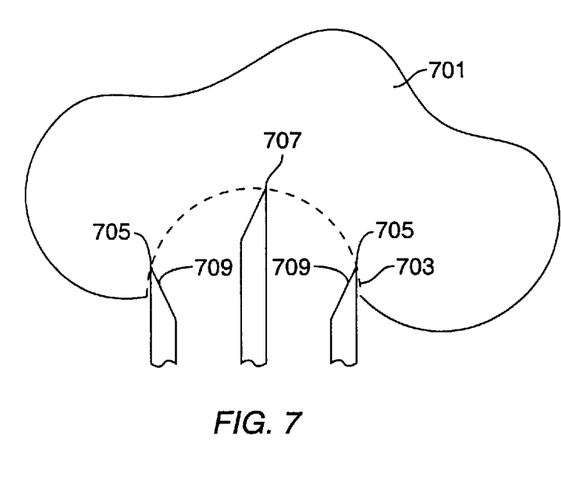
FIG. 7 is a simplified front-view diagram of a mandrel device holding a hard disk according to an alternative embodiment of the present invention.

FIG. 7 is a simplified front-view diagram of a mandrel device holding a hard disk according to an alternative embodiment of the present invention. This diagram is merely an illustration and should not limit the scope of the claims herein. As shown, disk 701 has opening 703, which is substantially circular in shape. Opening 703 is supported by at least three positions, including positions 705, which are defined on outer members, and position 707, which is defined on inner member. The three positions, which are actually knife edges, support opening 703, which supports disk 701. The three positions support the disk in a vertical manner.

The knife edges also can draw fluid away from the disk to enhance cleaning and/or drying of the disk in some embodiments. Center knife edge 707 has a point with a sloping side that draws fluid away from the disk. Preferably, each outside edge 705 contacts the disk at an upper end or point that draws fluid away along sloping edge 709 in a downward manner away from the disk. The slope toward the knife edge ranges in angle from about 15 degrees to about 60 degrees but can also be at other angles. Preferably, the angle ranges from about 30 degrees to 45 degrees for a knife edge made of a material called PEEK™ for conventional 135 mm to 48 mm hard disks. The combination of the knife edges and sloping angles draws fluid away from the disk to substantially remove all liquid droplets and/or water spots from a wet disk during disk processing, for example.

Figure 8:
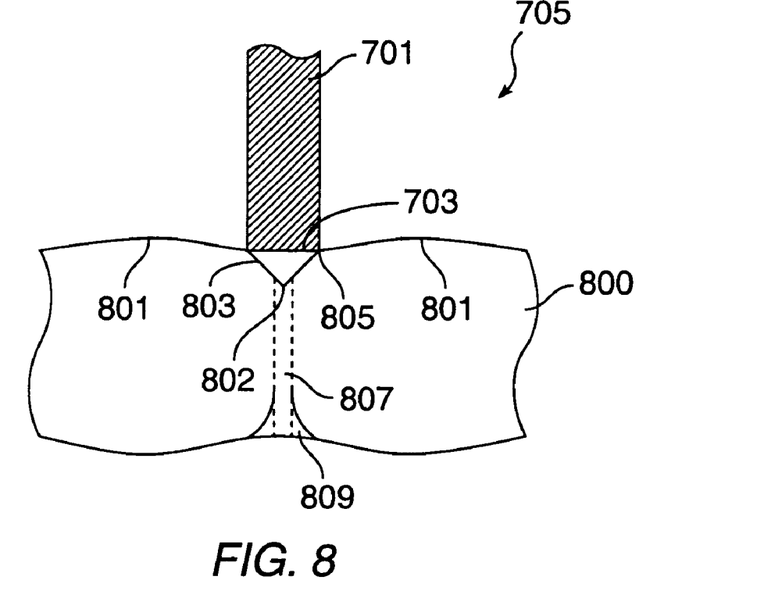
FIG. 8 is a simplified side-view diagram of a mandrel device holding a hard disk according to an alternative embodiment of the present invention.

FIG. 8 is a simplified side-view diagram of a mandrel device holding a hard disk according to an alternative embodiment of the present invention. This diagram is merely an illustration and should not limit the scope of the claims herein. Like reference numerals are used in this Fig. as the previous Fig. for easy cross-referencing. FIG. 8 is a simplified side-view diagram of knife edge 705 according to an embodiment of the present invention. The knife edge 705 includes a variety of features such as side member 800. Side member 800 includes a first sloped region 801 that slopes downwardly towards a center region 802 that is defined below the first sloped region. The center region supports opening 703 of disk 701. First sloped region is defined on each side of the center region to help align the disk opening toward the center region. First sloped region transitions 805 to a second sloped region 803 that has a steeper slope or gradient toward the center region than the slope of the first sloped region. The second sloped region is defined on each side of the center region and slopes downwardly towards the center region. Disk opening 703 is supported at or near the transition region 805. During processing, liquid droplets from the disk opening can traverse downwardly toward the center region. In some embodiments, the angle between the two sloped second regions is about 90 degrees but can also be at other angles.

Figure 9:
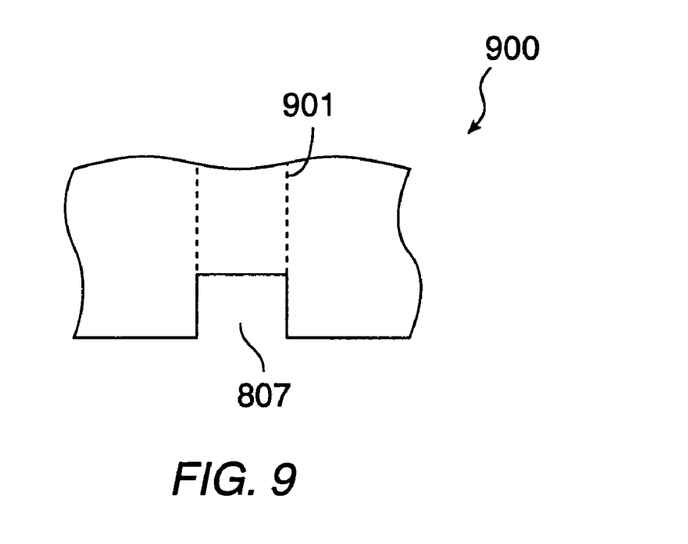
FIG. 9 is a simplified top-view diagram of the device of FIG. 8 according to an embodiment of the present invention.

In some embodiments, a channel 807 is coupled to the center region and is used to carry fluid or liquid away from the center region. The channel can be fully or partially formed into the member. The channel runs along in parallel to or in a substantial parallel alignment with the disk, but can also be at other angles. In some embodiments, the channel is flared 809 at a terminating end to pull liquid away from the center region. A simplified top-view diagram 900 of the member is shown by FIG. 9. The channel 807 is partially formed into the member. A fully formed channel 901 will cut completely into the member, but will need to be supported using alternative mechanical devices. In processes using a liquid such as water, the channel pulls liquid droplets from the center region or the disk using a capillary action. In these processes, it is desirable to have a capillary made of a hydrophobic type material, which can be the material of the member itself or a coating placed on the material. In still other embodiments, the capillary is coupled to an orifice that draws liquid away from the center region using a driving force. In these embodiments, the orifice may be coupled to a vacuum or a suction that draws liquid from the center region to pull any dropletts away from the disk. The orifice can be formed within the member or can be made of an external tube or pipe.

The present mandrel device can be made from any suitable material that has certain desirable properties. For example, the mandrel device material should be of sufficient strength to support a plurality of disks for transportation. Additionally, the mandrel device material should be sufficiently chemical resistant, e.g., acids, bases, solvents. The material should also be resistant to "wear and tear" from transporting disks. That is, the disk opening is supported on knife edges that must keep their shape and strength, even after repeated use. The material should also be capable of preventing any physical damage to the disk, which is often fragile from coatings and the like. Furthermore, the material should have relatively smooth surfaces from preventing any particles from attaching or being attracted onto the material. As merely an example, the material can be a product made by a company called PEEK™, but is not limited to such a material. Other materials include stainless steel, aluminum, PVDF, Teflon™, and the like.

While the above is a full description of the specific embodiments, various modifications, alternative constructions, and equivalents may be used. For example, while the description above is in terms of a method and apparatus for hard disk substrates, it would be possible to implement the present invention to the manufacture of other applications requiring high purity wet processing such as steps of rinsing, drying, cleaning, and the like. A skilled artisan may, alternatively, employ such systems to other industries such as electrochemical, pharmaceutical, printed circuit board, optical devices, and any other industry that needs an improved technique to rinse and dry an article of manufacture. Furthermore, the present invention can be employed with almost any object having a center opening that can be used to support the object.

Therefore, the above description and illustrations should not be taken as limiting the scope of the present invention which is defined by the appended claims.

What is claimed is:

1. A mandrel for supporting a plurality of hard disks, said mandrel comprising:

an elongated member comprising a first end and a second end, said first end being insertable into an opening in one of a plurality of hard disks, said second end having a support structure to transfer said elongated member;

an inner member defined in said elongated member, said inner member extending along a portion of said first end to said second end, said inner member comprising an upper surface having a plurality ridges, each of said ridges having a lower region defined between a pair of upper regions; and a pair of outer members defined in said elongated member and extending substantially parallel to said inner member, said inner member being defined between said pair of outer members, each of said pair of outer members comprising an upper surface having a plurality of ridges, each of said ridges having a lower region defined between a pair of upper members;

wherein at least one of said lower region in said inner member is substantially in parallel alignment with said lower region in each of said pair of outer members to support an opening region of a disk, whereupon said inner member and said pair of outer members prevent substantial movement of said disk.

2. The mandrel of claim 1 wherein said parallel alignment is substantially perpendicular to said elongated member.

3. The mandrel of claim 1 wherein said lower region in said inner member comprises a pair of bevelled regions extend to an intersection, said intersection defining an apex, said apex being in contact with a portion of said opening region in said disk.

4. The mandrel of claim 3 wherein said apex draws any fluid that may be attached to said disk.

5. The mandrel of claim 1 wherein said lower region in each of said pair of inner members comprising a positively sloped region defined towards said inner member.

6. The mandrel of claim 1 wherein said lower region in each of said pair of outer members being defined said lower region of said inner member.

7. The mandrel of claim 1 wherein said lower region in each of said pair of outer members comprise an outer region that contacts a portion of said opening region in said disk.

8. The mandrel of claim 7 wherein said outer region draws any fluid that may be attached to said disk.

9. The mandrel of claim 1 wherein at least two of said lower regions are in parallel alignment with at least two lower regions, respectively, in said pair of outer members to support a two hard disks, whereupon said inner member and said pair of outer members prevent a possibility of said two disks from sticking to each other during any movement of said elongated mandrel.

10. The mandrel of claim 1 wherein said inner member and said pair of outer members are made from a common material.

11. The mandrel of claim 1 is provided in a cleaning vessel.

12. A cleaning system for disks, said cleaning system comprising a chamber coupled to a mandrel for transferring disks in and out of said chamber, said mandrel comprising:

an elongated member comprising a first end and a second end, said first end being insertable into an opening in one of a plurality of hard disks, said second end having a support structure;

an inner member defined in said elongated member, said inner member extending along a portion of said first end to said second end, said inner member comprising an upper surface having a plurality ridges, each of said ridges having a lower region defined between a pair of upper regions; and a pair of outer members defined in said elongated member and extending substantially parallel to said inner member, said inner member being defined between said pair of outer members, each of said pair of outer members comprising an upper surface having a plurality of ridges, each of said ridges having a lower region defined between a pair of upper members;

wherein at least one of said lower region in said inner member is substantially in parallel alignment with said lower region in each of said pair of outer members to support an opening region of a disk, whereupon said inner member and said pair of outer members prevent substantial movement of said disk.

13. The system of claim 12 wherein said parallel alignment is substantially perpendicular to said elongated member.

14. The system of claim 12 wherein said lower region in said inner member comprises a pair of bevelled regions extend to an intersection, said intersection defining an apex, said apex being in contact with a portion of said opening region in said disk.

15. The system of claim 14 wherein said apex draws any fluid that may be attached to said disk.

16. The system of claim 12 wherein said lower region in each of said pair of inner members comprising a positively sloped region defined towards said inner member.

17. The system of claim 12 wherein said lower region in each of said pair of outer members being defined said lower region of said inner member.

18. The system of claim 12 wherein said lower region in each of said pair of outer members comprise an outer region that contacts a portion of said opening region in said disk.

19. The system of claim 18 wherein said outer region draws any fluid that may be attached to said disk.

20. The system of claim 12 wherein at least two of said lower regions are in parallel alignment with at least two lower regions, respectively, in said pair of outer members to support a two hard disks, whereupon said inner member and said pair of outer members prevent a possibility of said two disks from sticking to each other during any movement of said elongated mandrel.

21. The system of claim 12 wherein said inner member and said pair of outer members are made from a common material.

* * * * *